(12) United States Patent
Hiltgen

(10) Patent No.: US 11,809,540 B2
(45) Date of Patent: *Nov. 7, 2023

(54) SYSTEM AND METHOD FOR FACILITATING AUTHENTICATION VIA A SHORT-RANGE WIRELESS TOKEN

(71) Applicant: UBS Business Solutions AG, Zurich (CH)

(72) Inventor: Alain Hiltgen, Birmensdorf (CH)

(73) Assignee: UBS Business Solutions AG, Zurich (CH)

( * ) Notice: Subject to any disclaimer, the term of this patent is extended or adjusted under 35 U.S.C. 154(b) by 215 days.

This patent is subject to a terminal disclaimer.

(21) Appl. No.: 16/842,668

(22) Filed: Apr. 7, 2020

(65) Prior Publication Data
US 2020/0233947 A1 Jul. 23, 2020

Related U.S. Application Data

(63) Continuation of application No. 15/804,973, filed on Nov. 6, 2017, now Pat. No. 10,650,130.

(51) Int. Cl.
*G06F 21/00* (2013.01)
*G06F 21/34* (2013.01)
(Continued)

(52) U.S. Cl.
CPC .............. *G06F 21/34* (2013.01); *G06F 21/35* (2013.01); *H04L 9/3234* (2013.01);
(Continued)

(58) Field of Classification Search
CPC ....... G06F 21/34; G06F 21/35; H04L 9/3242; H04L 9/3234; H04L 9/3247;
(Continued)

(56) References Cited

U.S. PATENT DOCUMENTS 10,356,088 B1 7/2019 Peddada et al.
2004/0139152 A1 7/2004 Kaler et al.
(Continued)

FOREIGN PATENT DOCUMENTS

WO 2016114841 A1 7/2016

OTHER PUBLICATIONS

European Patent Office Extended European Search Report dated Apr. 2, 2019 for related European Patent Application No. EP18204253.1 filed Nov. 5, 2018 claiming priority to U.S. Appl. No. 15/804,973.

*Primary Examiner* — Michael M Lee
(74) *Attorney, Agent, or Firm* — Pillsbury Winthrop Shaw Pittman LLP

(57) ABSTRACT

In certain embodiments, a token (e.g., a short-range wireless token or other token) may be provided to facilitate authentication. In some embodiments, the token may obtain a first challenge from a computer system. The token may determine which challenge type of multiple challenge types the first challenge corresponds. The token may cause a secure component to use a key associated with a first challenge type to generate a first challenge response for the first challenge based on the first challenge corresponding to the first challenge type, where the key associated with first challenge type may be selected by the secure component from multiple keys (for the generation of the first challenge response) based on the first challenge corresponding to the first challenge type. The first challenge response may be provided to the computer system.

13 Claims, 10 Drawing Sheets

(51) Int. Cl.
  *H04L 9/32*   (2006.01)
  *G06F 21/35*  (2013.01)
  *H04L 9/40*   (2022.01)
  *H04W 12/06*  (2021.01)
  *H04W 4/80*   (2018.01)

(52) U.S. Cl.
  CPC .......... *H04L 9/3242* (2013.01); *H04L 9/3247* (2013.01); *H04L 9/3271* (2013.01); *H04L 63/0492* (2013.01); *H04L 63/0853* (2013.01); *H04W 12/06* (2013.01); *H04L 2209/805* (2013.01); *H04W 4/80* (2018.02)

(58) Field of Classification Search
  CPC ............... H04L 9/3271; H04L 63/0492; H04L 63/0853; H04L 2209/805; H04W 12/06; H04W 4/80
  See application file for complete search history.

(56) References Cited

U.S. PATENT DOCUMENTS

| | | |
|---|---|---|
| 2006/0156385 A1 | 7/2006 | Chiviendacz et al. |
| 2007/0106897 A1* | 5/2007 | Kulakowski ............ H04L 9/083 713/168 |
| 2007/0186105 A1 | 8/2007 | Bailey et al. |
| 2007/0286373 A1 | 12/2007 | Pailles et al. |
| 2008/0184355 A1 | 7/2008 | Walrath et al. |
| 2009/0089583 A1 | 4/2009 | Patel |
| 2009/0119754 A1 | 5/2009 | Schubert |
| 2013/0268687 A1* | 10/2013 | Schrecker ............ H04W 12/06 709/229 |
| 2013/0268767 A1* | 10/2013 | Schrecker ............... G06F 21/31 713/185 |
| 2015/0007289 A1* | 1/2015 | Godse ..................... G06F 21/31 726/7 |
| 2015/0318998 A1* | 11/2015 | Erlikhman ........... H04L 9/0863 713/171 |
| 2015/0334515 A1 | 11/2015 | Hiltgen |
| 2017/0012951 A1* | 1/2017 | Mennes ................. H04L 63/06 |
| 2017/0161490 A1* | 6/2017 | Fedor ..................... G06F 21/31 |
| 2017/0244697 A1 | 8/2017 | Caceres et al. |
| 2017/0279798 A1 | 9/2017 | Reynolds |
| 2018/0343238 A1 | 11/2018 | Tola |

* cited by examiner

SYSTEM AND METHOD FOR FACILITATING AUTHENTICATION VIA A SHORT-RANGE WIRELESS TOKEN

RELATED APPLICATIONS

This application is a continuation of U.S. patent application Ser. No. 15/804,973, filed Nov. 6, 2017, entitled "System and Method for Facilitating Authentication Via a Short-Range Wireless Token," which is hereby incorporated by reference herein in its entirety.

FIELD OF THE INVENTION

The invention relates to use of a token, such as a short-range wireless token, to facilitate authentication.

BACKGROUND OF THE INVENTION

A security (or authentication) token is traditionally a small device that a user carries to authorize access to a network service. The device may be in the form of a smart card or tag or provided in some other form factor. Generally, security tokens may provide an extra level of assurance, where the user provides a personal identification number (PIN) (which authorizes the user as the owner of that particular device), and the device generates an integrity code that may be used to authenticate the user to the service, allowing the user to log in. A single token, however, is typically limited to one particular purpose or performs the exact same set of operations (for each valid set of PIN and challenge) to generate a challenge response (e.g., in the form of an integrity code). Moreover, typical self-powered short-range wireless tokens have a very short life or need to have their batteries replaced frequently—an issue that results from a waste of processing power, memory, power, or other computer resources for computations that are unnecessary in certain circumstances (e.g., when the challenge itself is inaccurate). These and other drawbacks exist.

SUMMARY OF THE INVENTION

Aspects of the invention relate to methods, apparatuses, and/or systems for facilitating authentication via a short-range wireless token.

In some embodiments, a single token may serve multiple purposes, such as (i) authentication to log into a secure session or to prove that a user of client device 104 is an authorized user (e.g., an authorized user of a mobile application, an authorized user of a financial platform, etc.), (ii) authentication for digitally signing documents, or (iii) other purposes. In one use case, one key may be used for digitally signing documents, and another key may be used for enabling a user to log into a session or to provide that the user is an authorized user. In another use case, one key may be used for digitally signing documents for one platform, another key may be used for digitally signing documents for another platform, and so on. Depending on the input that is obtained as a challenge, a certain set of procedures may be followed by the token. As an example, if the challenge is determined to correspond to a first challenge type, a key associated with the first challenge type may be selected by token 106 to generate a challenge response to the challenge. On the other hand, if the challenge is determined to correspond to a second challenge type, a key associated with the second challenge type may be selected by token 106 to generate a challenge response to the challenge. In some embodiments, the determination regarding the challenge's challenge type may be based on a size of the challenge (e.g., number of characters, number of bits, etc.), content of the challenge (e.g., what characters the challenge includes, where such characteristics are positioned within the challenge, etc.), or other criteria. In some embodiments, the challenge response may include an integrity code or other challenge response. As an example, the integrity code may include a message authentication code (MAC) or other integrity code.

In some embodiments, a token may obtain a challenge as plaintext or part of an encrypted message from a computer system. In some embodiments, if the challenge is obtained as plaintext from the computer system, the token may cause the challenge to be presented as plaintext on the token's display. Responsive to the challenge being presented, the token may obtain a user confirmation of validity of the challenge (e.g., the challenge accurately reflects a user input entered by a user, an identifier associated with the user, a randomly-generated code associated with the user, etc.). In some embodiments, the token may cause its secure component to generate the challenge response for the challenge based on the user confirmation of the validity of the challenge. In this way, by making the generation of the challenge response dependent on the user confirmation of the plaintext challenge, the token may reduce the utilization of processing power, memory, power, or other computer resources in some scenarios. As an example, component(s) of token 106 responsible for the challenge response generation may be powered down or suspended until at least the user confirmation triggers token 106 to power or increase power to that responsible component, thereby avoiding or otherwise reducing the responsible component(s)' use of power and other resources during the period in which the component(s) are powered down or suspended. In some embodiments, the decryption of the encrypted message may additionally or alternative be made to be dependent on the user confirmation, which may further avoid or otherwise reduce the responsible component(s)' use of power and other resources during the period in which the component(s) are powered down or suspended.

In some embodiments, the challenges of different challenge types may be generated or otherwise obtained in different manners. As an example, a challenge of one challenge type may be a randomly-generated challenge provided automatically by a computer system to a token, and a challenge of another challenge type may be a manual user input (e.g., a manual selection or entry of a name, address, phone number, account identifier, one pre-generated string of a selectable set of pre-generated strings, or other input). In one scenario, the automatically-provided randomly-generated challenge may be configured to be a six-character input challenge, and the manual user input may be an input challenge having other number(s) of characters (other than six characters). In other scenarios, other fixed or variable number of characters may be utilized for such challenges.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
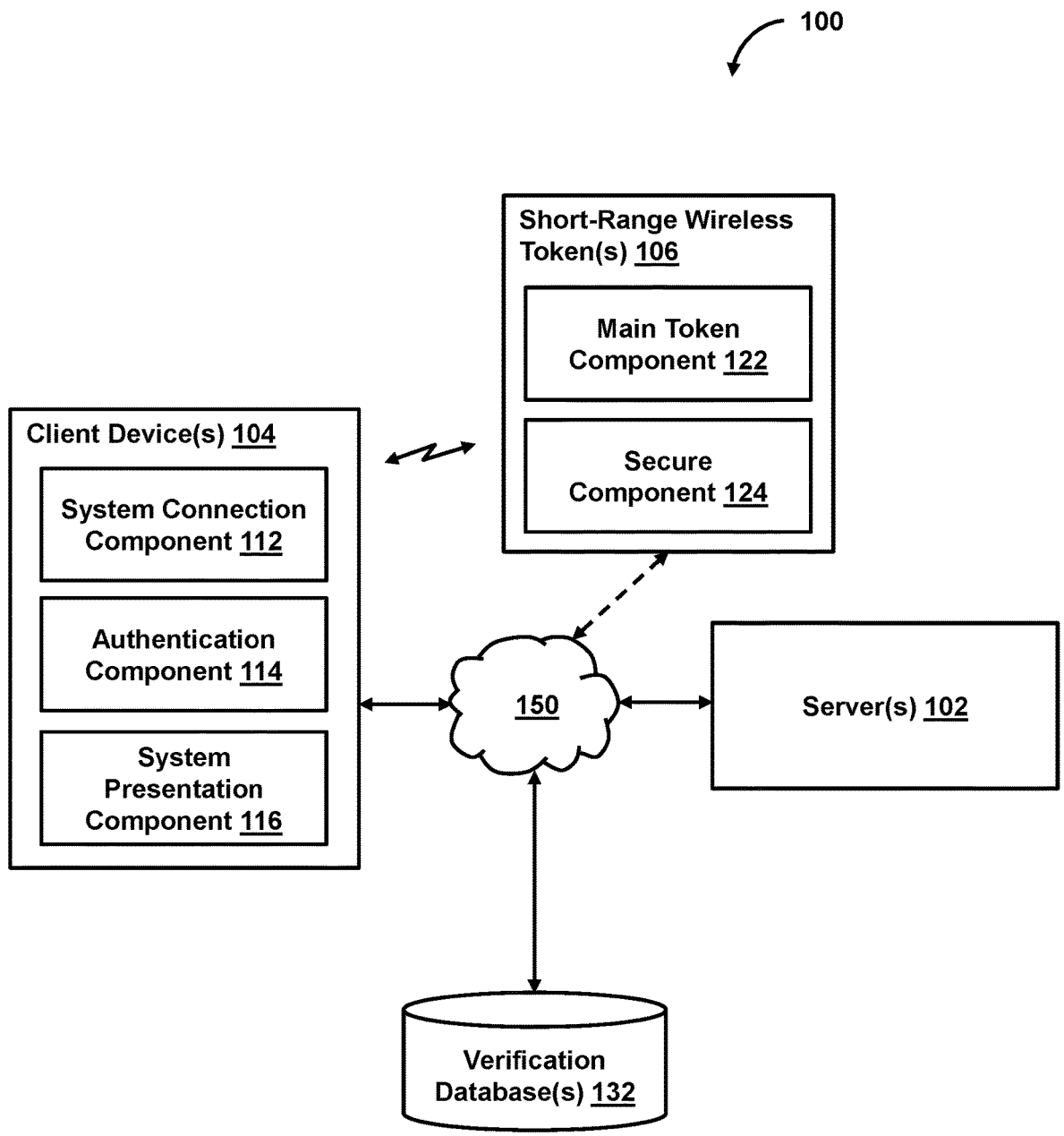
FIG. 1 shows a system for facilitating authentication via a short-range wireless token, in accordance with one or more embodiments.

FIG. 1 shows a system 100 for facilitating authentication via a short-range wireless token, in accordance with one or more embodiments. As shown in FIG. 1, system 100 may include server(s) 102, client device(s) 104, short-range wireless token(s) 106 (or other tokens), or other components. Client device 104 may include system connection component 112, authentication component 114, system presentation component 116, or other components. Each client device 104 may include any type of mobile terminal, fixed terminal, or other device. By way of example, client device 104 may include a desktop computer, a notebook computer, a tablet computer, a smartphone, a wearable device, or other client device. Users may, for instance, utilize one or more client devices 104 to interact with one another, one or more servers, one or more short-range wireless tokens (or other tokens), or other components of system 100.

Figure 2:
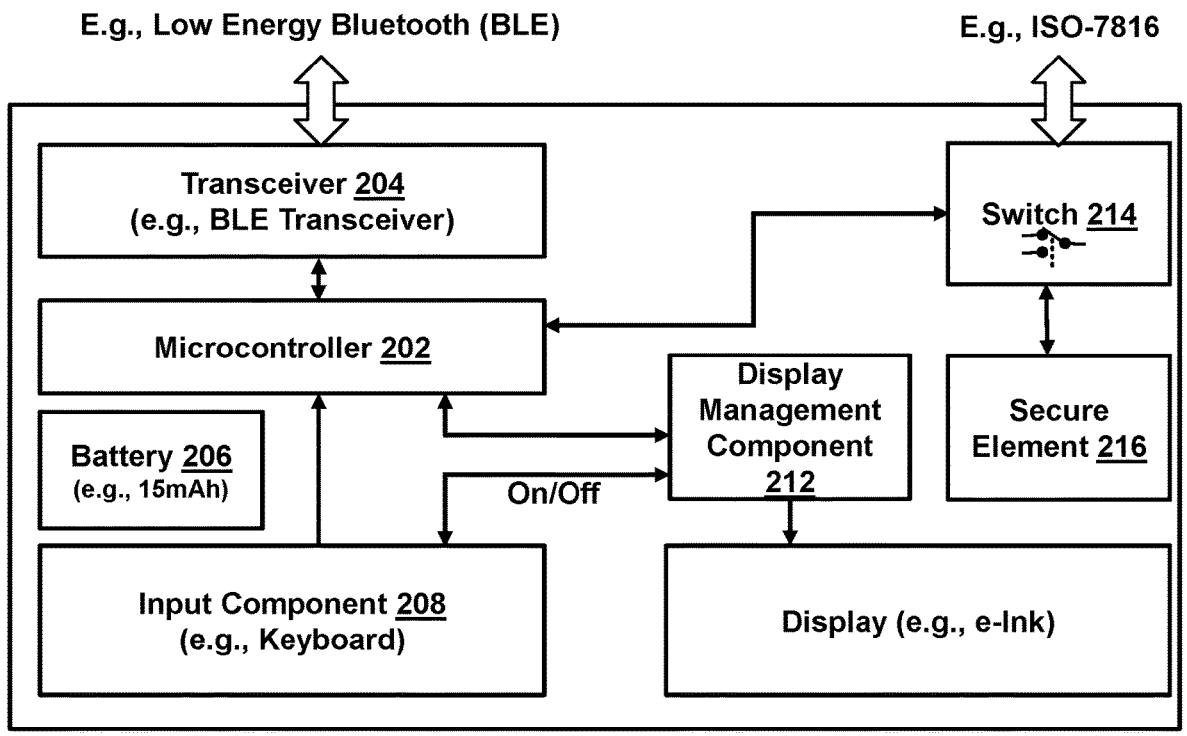
FIG. 2 shows a short-range wireless token for facilitating authentication, in accordance with one or more embodiments.
Figure 3A:
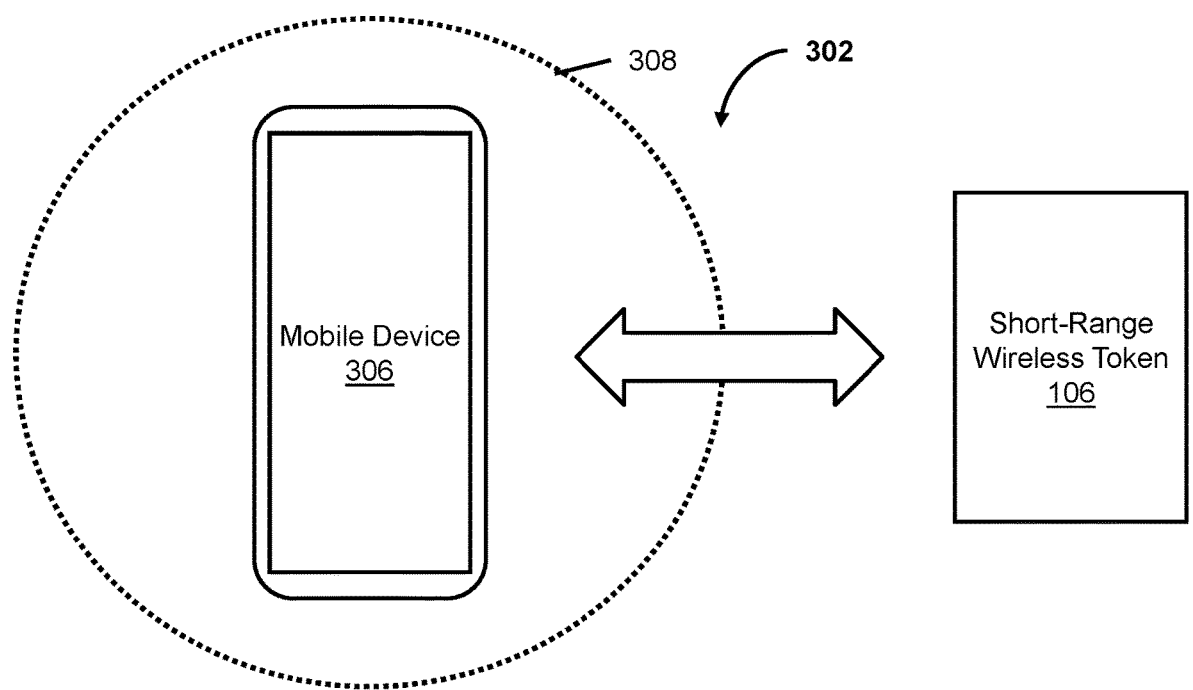
FIGS. 3A-3B show events that cause initiation of communication between a short-range wireless token and a client device, in accordance with one or more embodiments.
Figure 3B:
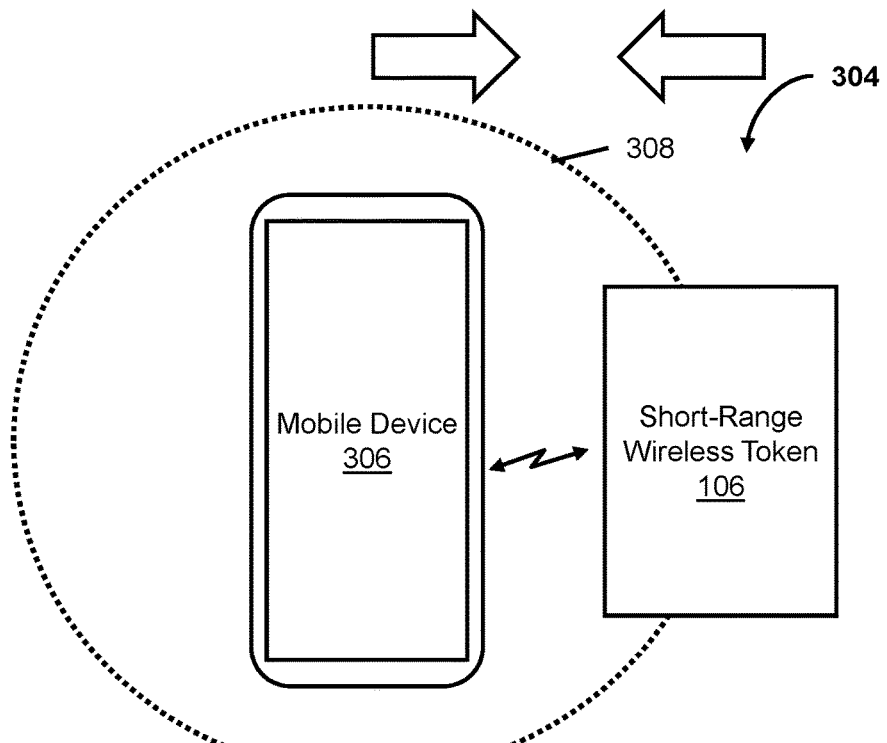

In some embodiments, token 106 may include main token component 122, secure component 124, or other components. In some embodiments, with respect to FIG. 2, main token component 122 may include microcontroller 202, transceiver 204, battery 206, input component 208 (e.g., keyboard, touch-based input device, voice-based input device, etc.), display 210 (or other output device, such as an audio output device, a haptic output device, etc.), display management component 212, switch 214, or other components. Secure component 124 may include secure element 216 or other components. In some embodiments, secure element 216 may include a Universal Integrated Circuit Card (UICC), an embedded secure element, a flash-drive-based secure element (e.g., microSD or other flash-drive-based secure element). Secure element 216 may be a tamper-resistant platform capable of securely hosting applications and their confidential and cryptographic data (e.g., key management) in accordance with the rules and security requirements set forth by a set of well-identified trusted authorities.

It should be noted that, while one or more operations are described herein as being performed by particular components of short-range wireless tokens 106, those operations may, in some embodiments, be performed by other components of short-range wireless tokens 106 or other components of system 100. As an example, while one or more operations are described herein as being performed by components of short-range wireless tokens 106, those operations may, in some embodiments, be performed by components of client device 104, other physical tokens, or other components. As another example, while one or more operations are described herein as being performed by components of client device 104, those operations may, in some embodiments, be performed by components of server 102.

In some embodiments, establishing a connection between two components involves the setting up of resources (e.g., computer memory and buffers, network resources, etc.) so that data may be transmitted from one of the components to the other one of the components. In some embodiments, as an example, when components are detected within one another's short wireless communication range (e.g., Wi-Fi, Bluetooth, Near Field Communication (NFC), etc.), a wireless connection may be established between the components based on the detection. Through the wireless connection, the components may directly communicate with one another. It should be noted that, although various embodiments are described with respect to use of short-range wireless tokens for authentication, it is contemplated that the approaches described herein may be utilized in other ways. It should also be noted that, although various embodiments are described with respect to active Bluetooth tokens, it is contemplated that the approaches described herein may apply to non-Bluetooth short-range wireless tokens and/or other tokens (e.g., other types of wireless tokens, non-wireless tokens which communicate via a Universal Serial Bus (USB) connection, an Ethernet connection, or other wired means, etc.). As used herein, tokens may refer to cards, dongles, tags, and/or other tokens, with or without PIN protection. Short-range wireless tokens may refer to tokens that communicate via Wi-Fi, Bluetooth, NFC, and/or other short-range wireless technologies.

Authentication Via a Token

In some embodiments, a token (e.g., token 106 or other token) and a computer system (e.g., server 102, client device 104, or other computer system separate from the token) may establish a connection between them. As an example, the computer system may present a "question" (e.g., the challenge) to which the token must provide a valid "answer" (e.g., the response). In one use case, the challenge-response protocol used by the computer system may include password authentication, where the challenge is asking for the password and the valid response is the correct password. In another use case, the challenge-response protocol used by the computer system may include the use of a cryptographic nonce as the challenge to ensure that every challenge-response sequence is unique (e.g., to protect against man-in-the-middle attacks, subsequent replay attacks, etc.). For example, a strong cryptographically secure pseudorandom number generator and cryptographic hash function can generate challenges that are highly unlikely to occur more than once. In some embodiments, server 102 may generate a challenge and provide the challenge to client device 104, which may subsequently provide the challenge to token 106. In some embodiments, token 106 may use a "secret" (e.g., a private key or other secret) shared between server 102 and token 106 (e.g., but not known to client device 104) to generate a challenge response to the challenge and provide the challenge response to client device 104, which may subsequently provide the challenge response to server 102. The challenge response may include an integrity code (e.g., a MAC, signature, or other integrity code) or other information. As an example, token 106 may use a secret to generate a MAC, and server 102 may use the secret to validate the MAC. As another example, token 106 may use a private key (of a public/private key pair) to generate a signature, and server 102 may use the public key (of the public/private key pair) to validate the signature.

In some embodiments, token 106 may obtain an encrypted message from client device 104, where the encrypted message includes a PIN (or other entity identifier), a challenge as a six-character input parameter (or as an input parameter having a different number of characters), or other information. Token 106 may decrypt the encrypted message to extract the PIN, the challenge, etc., from the encrypted message (e.g., by using a key corresponding to the key that was used to encrypt the message content). Upon verification of the PIN, token 106 may generate a challenge response for the challenge based on (i) one or more keys (e.g., a private/secret key), (ii) the challenge, (iii) other content of the message, or (iv) other information (e.g., current date, current time, or other information). As an example, token 106 may generate the challenge response by encrypting the challenge (or the message) with a secret (e.g., a private key or other secret) shared between the token and the component that generated the challenge) so that the encrypted challenge/message can be decrypted using the secret to verify the challenge response. As another example, token 106 may generate the challenge response by using a private key to sign the challenge (or the message) to generate a digital signature for the first challenge/message and combining the first challenge/message, the digital signature, or other information to create the challenge response (e.g., where the challenge response includes the digital signature but not the message, where the challenge response includes both the message and the digital signature, etc.). As yet another example, the challenge (or the message) may be provided as input to a hash function to generate a hash. A private key may be used to encrypt the hash to generate the digital signature (e.g., where the digital signature includes the encrypted hash). As a further example, the challenge response may be generated by encrypting the challenge (or the message) with the private key of the public/private key pair so that the encrypted challenge/message can be decrypted using the public key of the public/private key pair to verify the challenge response).

In some embodiments, token 106 may obtain a first challenge from a computer system (e.g., server 102, client device 104, or other computer system separate from token 106). Token 106 may use a particular key to generate a first challenge response for the first challenge based on the first challenge corresponding to a first challenge type, and provide the first challenge response to the computer system. With respect to a second challenge (e.g., that token 106 obtains from the same computer system or a different computer system), token 106 may use a particular key to generate a second challenge response for the second challenge based on the second challenge corresponding to a second challenge type. As an example, the key used to generate the first challenge response may be associated with the first challenge type, and the key used to generate the second challenge response may be associated with the second challenge type. The key associated with first challenge type may be selected (for generating the first challenge response) based on the first challenge corresponding to the first challenge type, and the key associated with the second challenge type may be selected (for generating the second challenge response) based on the second challenge corresponding to the second challenge type. In one use case, responsive to the first challenge corresponding to the first challenge type, a private key associated with the first challenge type may be selected to generate the first challenge response. Responsive to the second challenge corresponding to the second challenge type, a private key associated with the second challenge type may be selected to generate the second challenge response. In some embodiments, the key associated with the first challenge type and the key associated with the second challenge type may be different from one another. In some embodiments, the key associated with the first challenge type and the key associated with the second challenge type may be the same as one another.

In some embodiments, the challenges of different challenge types may be generated or otherwise obtained in different manners. As an example, a challenge of one challenge type may be a randomly-generated challenge provided automatically by a computer system to a token, and a challenge of another challenge type may be a manual user input (e.g., a manual selection or entry of a name, address, phone number, account identifier, one pre-generated string of a selectable set of pre-generated strings, or other input). In one scenario, the automatically-provided randomly-generated challenge may be configured to be a six-character input challenge, and the manual user input may be an input challenge having other number(s) of characters (other than six characters). In other scenarios, other fixed or variable number of characters may be utilized for such challenges.

In some embodiments, token 106 may obtain a first challenge from a computer system (e.g., server 102, client device 104, or other computer system separate from token 106) as at least part of a first encrypted message. Token 106 may decrypt the first encrypted message to extract the first challenge as plaintext from the first encrypted message. In some embodiments, token 106 may decrypt the first encrypted message to extract an entity identifier (e.g., a PIN or other entity identifier) as plaintext from the first encrypted message, and verify whether the entity identifier is a valid entity identifier. In some embodiments, token 106 may generate the first challenge response for the first challenge based on verification of the entity identifier indicating the entity identifier to be a valid entity identifier.

In some embodiments, token 106 may obtain a first challenge as plaintext from a computer system (e.g., server 102, client device 104, or other computer system separate from token 106). Token 106 may cause the first challenge to be presented as plaintext on a display of token 106. Subsequent to the first challenge being presented, token 106 may obtain a user confirmation of validity of the first challenge (e.g., the first challenge accurately reflects a user input entered by a user, an identifier associated with the user, a randomly-generated code associated with the user, transaction data, etc.). As an example, the user confirmation may be provided via a physical action invoked with respect to token 106, which indicates confirmation of the validity of what was presented on the display (e.g., a hard or soft button/key or other input component on or connected to token 106 being pressed, held for a predetermined period of time, released, etc.). In some embodiments, token 106 may obtain a first encrypted message from a computer system (e.g., server 102, client device 104, or other computer system separate from token 106), and token 106 may cause its secure component to decrypt the first encrypted message to extract a challenge, an entity identifier (e.g., a PIN or other entity identifier), or other information as plaintext from the first encrypted message based on the user confirmation of the validity of the first challenge. In some embodiments, token 106 may cause the secure component to generate the first challenge response for the first challenge based on the extracted first challenge matching the first challenge obtained as plaintext from the client device, (ii) verification of the entity identifier indicating the entity identifier to be a valid entity identifier, or (ii) other criteria. In this way, by conditioning the decryption of the encrypted message on the user confirmation of the plaintext first challenge, token 106 may reduce the utilization of processing power, memory, power, or other computer resources in some scenarios. As an example, component(s) of token 106 responsible for the decryption or challenge response generation may be powered down or suspended until at least the user confirmation triggers token 106 to power or increase power to that responsible component, thereby avoiding or otherwise reducing the responsible component(s)' use of power and other resources during the period in which the component(s) are powered down or suspended.

Components 112-124

In some embodiments, system connection component 112 and/or main token component 122 may cause one or more connections to be established between client device 104 and token 106. The established connections may include one or more wireless connections, wired connections, or other connections. The wireless connections may include one or more cellular connections, Wi-Fi connections, Bluetooth connections, NFC connections, or other wireless connections. The wired connections may include one or more USB connections, Ethernet connections, or other wired connections. Through the established connections, client device 104 and token 106 may directly communicate with one another.

In some embodiments, authentication component 114 (of client device 104) may provide one or more challenges to token 106, and, in response, authentication component 114 may obtain one or more challenge responses (for the respective challenges) from token 106. The challenge responses may include one or more integrity codes, such as MACs or other integrity codes. In some embodiments, a challenge response may be generated based on a private key stored in a secure local storage at token 106 (e.g., within secure component 124 of token 106). In some embodiments, as part of the challenge response or in addition to the challenge response, authentication component 114 may obtain a key (corresponding to the private key stored at token 106) or other information from token 106. Authentication component 114 may perform verification of the challenge response (e.g., via public-key-based verification, secret-key-based verification, signature verification, or other techniques as described herein).

In some embodiments, system presentation component 116 (of client device 104) may cause one or more user interfaces to be presented on client device 104. Through such user interfaces, a user may interact with one or more services of client device 104, one or more network services of server(s) 102, other client device(s) 104, token(s) 106, or other components. As an example, a user interface may enable the user to enter his/her PIN, select or enter a challenge, cause a challenge to be randomly generated and automatically provided to token 106, obtain notifications of authentication or failure to authenticate with his/her token(s) 106, or perform other operations.

In some embodiments, responsive to obtaining a first challenge from client device 104, main token component 122 (of token 106) may cause secure component 124 (of token 106) to generate a first challenge response (for the first challenge), and provide the first challenge response to client device 104. In some embodiments, main token component 122 may determine which challenge type the first challenge type corresponds, and cause secure component 124 to use a particular key to generate the first challenge response based on the first challenge corresponding to the first challenge type. As an example, the key used to generate the first challenge response may be associated with the first challenge type. The key associated with first challenge type may be selected (for generating the first challenge response) based on the first challenge corresponding to the first challenge type. In one scenario, responsive to the first challenge corresponding to the first challenge type, a private key associated with the first challenge type may be selected (and obtained from the secure memory) to generate the first challenge response. Secure component 124 may select the key(s) (associated with the first challenge type) from multiple keys stored in its secure memory (e.g., memory integrated as part of secure component 124). The multiple keys stored in the secure memory may include multiple private keys, multiple public keys (respectively corresponding to the private keys), or other keys. At least one of the public/private keys may be associated with a different challenge type from at least another one of the public/private keys. In some embodiments, one key (or one public/private key pair) may be associated with two or more challenge types.

As an example, a single token 106 may serve multiple purposes, such as (i) authentication to log into a secure session or to prove that a user of client device 106 is an authorized user (e.g., an authorized user of a mobile application, an authorized user of a financial platform, etc.), (ii) authentication for digitally signing documents, or (iii) other purposes. In one use case, one key may be used for digitally signing documents, and another key may be used for enabling a user to log into a session or to provide that the user is an authorized user. In another use case, one key may be used for digitally signing documents for one platform, another key may be used for digitally signing documents for another platform, and so on. In some embodiments, a first key stored in memory within secure component 124 may be associated with a first challenge type, a second key stored in memory within secure component 124 may be associated with a second challenge type, and so on. Upon obtaining a challenge of the first challenge type (and determining that the challenge is of the first challenge type), a first set of procedures may be followed by components of token 106. The first set of procedures may include use of the first key, performance of a first set of operations, or other procedures. Upon obtaining a challenge of the second challenge type (and determining that the challenge is of the second challenge type), a second set of procedures may be followed by components of token 106. The second set of procedures may include use of the second key, performance of a second set of operations, or other procedures.

In one scenario, for example, responsive to obtaining an encrypted message (including a PIN and a six-character input as a challenge), secure component 124 may decrypt the encrypted message to extract the PIN and the six-character challenge as plaintext from the encrypted message. Based on the extracted information (e.g., the six-character challenge), main token component 122 or secure component 124 may determine that the challenge corresponds to the second challenge type (e.g., related to authenticating a user for logging into a session). Based on such determination, secure component 124 may select the second key (associated with the second challenge type), and use the second key to generate the challenge response (for the challenge corresponding to the second challenge type). The performance of the generation of the challenge response may additionally or alternatively be conditioned on the PIN being verified as a valid PIN (e.g., by determining whether the PIN matches a PIN stored in memory within secure component 124).

In another scenario, responsive to obtaining an encrypted message (including a PIN and an other-size-character input that is greater than or less than six characters as a challenge), secure component 124 may decrypt the encrypted message to extract the PIN and the other-size-character challenge as plaintext from the encrypted message. Based on the extracted information (e.g., the other-size-character challenge), main token component 122 or secure component 124 may determine that the challenge corresponds to the first challenge type (e.g., related to digitally signing documents for a particular platform, related to digitally signing documents for multiple platforms, etc.). Based on such determination, secure component 124 may select the first key (associated with the first challenge type), and use the first key to generate the challenge response (for the challenge corresponding to the first challenge type). The performance of the generation of the challenge response may additionally or alternatively be conditioned on the PIN being verified as a valid PIN (e.g., by determining whether the PIN matches a PIN stored in memory within secure component 124).

In yet another scenario, responsive to obtaining an other-size-character input (other than six characters) as a plaintext challenge, main token component 122 may cause the plaintext challenge to be presented on the token's display. In some embodiments, main token component 122 may determine that the challenge corresponds to the first challenge type (e.g., related to digitally signing documents for a particular platform, related to digitally signing documents for multiple platforms, etc.) based on the size of the plaintext challenge (e.g., that the number of characters in the plaintext challenge is not equal to six characters), content of the plaintext challenge, or other aspect of the plaintext challenge. In other scenarios, the challenge may be determined to correspond to the first challenge type based on a set of characters in the challenge from position A to position B of the challenge (e.g., if characters in positions A-B are within a certain character or number range, then challenge type=first challenge type), a position of the set of characters in the challenge (e.g., if the set of characters are in positions C-D of the challenge, then challenge type=first challenge type), or other criteria.

Based on such determination (that the challenge corresponds to the first challenge type), main token component 122 may cause the plaintext challenge to be presented on the token's display. Responsive to obtaining a user confirmation that the challenge is accurate, secure component 124 may obtain a first encrypted message (including a PIN and the other-size-character input as the challenge) and decrypt the encrypted message to extract the PIN and the other-size-character challenge as plaintext from the encrypted message. Based on such determination (that the challenge corresponds to the first challenge type) and the user confirmation, secure component 124 may select the first key (associated with the first challenge type), and use the first key to generate the challenge response (for the challenge corresponding to the first challenge type). In addition, in some scenarios, main token component 122 may provide power or increase power to secure component 124 (e.g., to turn on secure component 124 or wake it from a sleep or suspended mode) based on the user confirmation. On the other hand, if the user confirmation that the challenge is accurate is not obtained (e.g., within a predetermined threshold amount of time subsequent the presentation) or a user input indicating an inaccuracy of the challenge is obtained, main token component 122 may not provide power or increase power to secure component 124 (e.g., thus, leaving secure component 124 off, in a suspended mode, or in a sleep mode), thereby saving processing power, memory, power, or other computer resources in such scenarios when the user has indicated that the challenge is inaccurate.

Example Flowcharts

FIGS. 4A, 4B, 5, and 6 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 4A:
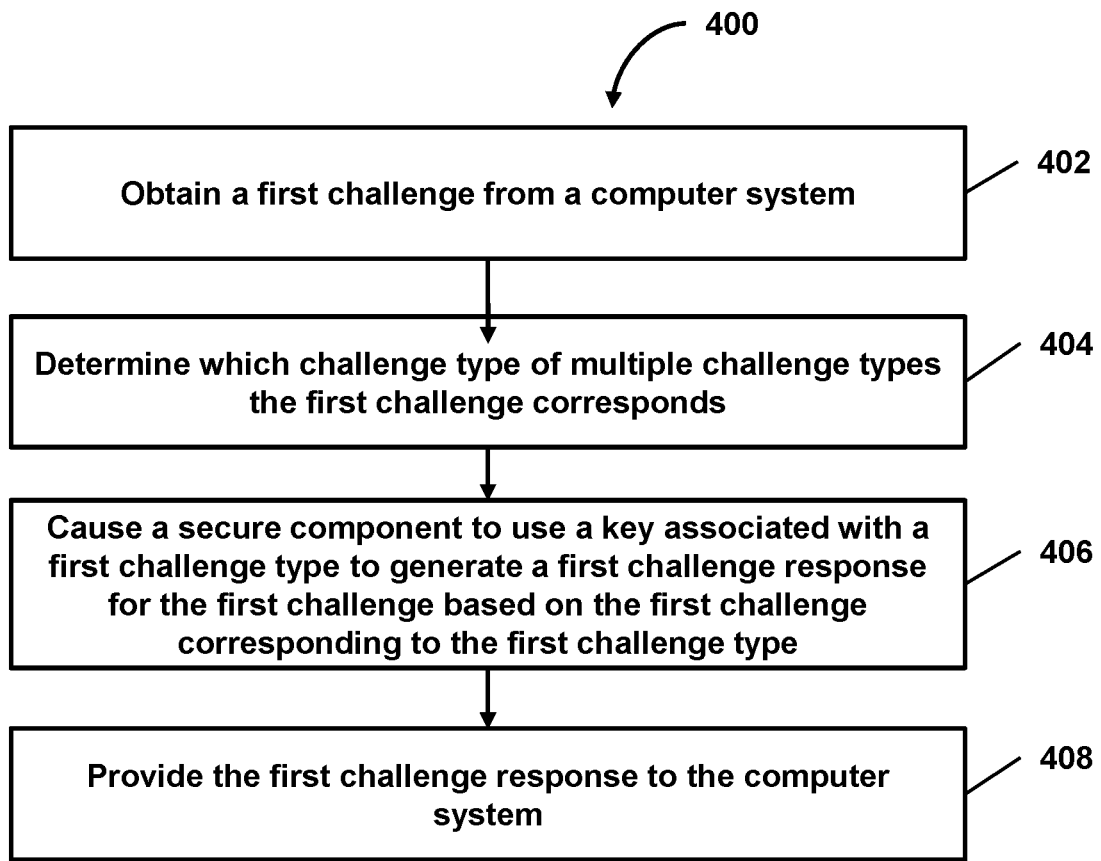
FIGS. 4A-4B show flowcharts of methods of facilitating authentication via a token, in accordance with one or more embodiments.

FIG. 4A shows a flowchart of a method 400 of facilitating authentication via a token, in accordance with one or more embodiments. In an operation 402, a first challenge may be obtained from a computer system. As an example, a token (e.g., a short-range wireless token or other token) may obtain the first challenge as plaintext, as at least part of an encrypted message, or in other manners from a client device (or other component) via a connection established between the token and the client device (e.g., via a wireless or wired connection). The first challenge may be a randomly-generated challenge or other automatically-generated challenge, a manual user input, or other challenge. With regard to a randomly-generated challenge, for instance, a strong cryptographically secure pseudorandom number generator and cryptographic hash function may be utilized to generate challenges that are highly unlikely to occur more than once. Operation 402 may be performed by a main token component that is the same as or similar to main token component 122, in accordance with one or more embodiments.

In an operation 404, a determination of which challenge type (of multiple challenge types) the first challenge corresponds may be effectuated. As an example, the determination regarding the first challenge's challenge type may be based on a size of the first challenge (e.g., number of characters, number of bits, etc.), content of the first challenge (e.g., what characters the first challenge includes, where such characteristics are positioned within the first challenge, etc.), or other criteria. Operation 404 may be performed by a main token component or secure component that are the same as or similar to main token component 122 or secure component 124, in accordance with one or more embodiments.

In an operation 406, a secure component (e.g., of a token) may be caused to use a key associated with a first challenge type to generate a first challenge response (for the first challenge) based on the first challenge corresponding to the first challenge type. As an example, the first challenge may be determined to match the first challenge type based on a size of the first challenge (e.g., number of characters, number of bits, etc.), content of the first challenge (e.g., what characters the first challenge includes, where such characteristics are positioned within the first challenge, etc.), or other criteria. As another example, the key associated with first challenge type being selected from multiple keys based on the first challenge corresponding to the first challenge type. In one use case, responsive to the first challenge corresponding to the first challenge type, a private key associated with the first challenge type may be selected (from multiple private keys) to generate the first challenge response. As described herein, in some embodiments, the first challenge response may be generated based on a private key or other information. Operation 406 may be performed by a main token component or secure component that are the same as or similar to main token component 122 or secure component 124, in accordance with one or more embodiments.

In an operation 408, the first challenge response may be provided to the computer system. As an example, if the first challenge response is generated by a token (e.g., a short-range wireless token or other token), the token may provide the first challenge response to the computer system via a connection established between the token and the computer system (e.g., via a wireless or wired connection). Operation 408 may be performed by a main token component that is the same as or similar to main token component 122, in accordance with one or more embodiments.

Figure 4B:
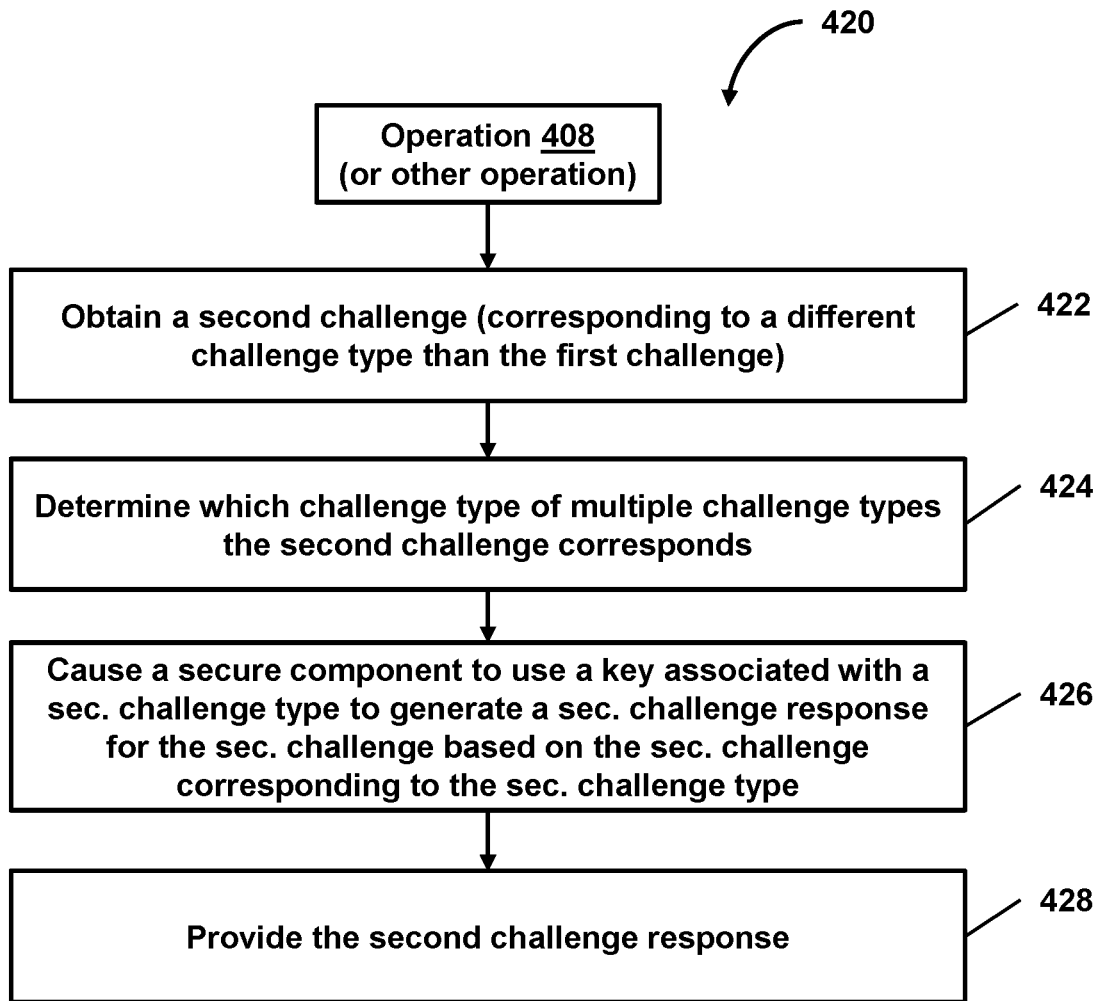

FIG. 4B shows a flowchart of a method 420 of facilitating authentication via a token, in accordance with one or more embodiments. In addition to the first challenge being obtained, and the first challenge response being generated, a second challenge (being of a different challenge type than the first challenge) may be obtained in operation 422. As an example, a token (e.g., a short-range wireless token or other token) may obtain both the first and second challenges from the same computer system or from different computer systems. Each of the first and second challenges may be obtained from a computer system as plaintext, as at least part of an encrypted message, or in other manners via a connection established between the token and the computer system (e.g., via a wireless or wired connection). Each of the first and second challenges may be a randomly-generated challenge or other automatically-generated challenge, a manual user input, or other challenge. Operation 422 may be performed by a main token component that is the same as or similar to main token component 122, in accordance with one or more embodiments.

In an operation 424, a determination of which challenge type (of multiple challenge types) the second challenge corresponds may be effectuated. As an example, the determination regarding the second challenge's challenge type may be based on a size of the second challenge (e.g., number of characters, number of bits, etc.), content of the second challenge (e.g., what characters the second challenge includes, where such characteristics are positioned within the second challenge, etc.), or other criteria. Operation 424 may be performed by a main token component or secure component that are the same as or similar to main token component 122 or secure component 124, in accordance with one or more embodiments.

In an operation 426, a secure component (e.g., of a token) may be caused to use a key associated with a second challenge type to generate a second challenge response (for the second challenge) based on the second challenge corresponding to the second challenge type. As an example, the second challenge may be determined to match the second challenge type based on a size of the second challenge (e.g., number of characters, number of bits, etc.), content of the second challenge (e.g., what characters the second challenge includes, where such characteristics are positioned within the second challenge, etc.), or other criteria. As another example, the key associated with second challenge type being selected from multiple keys based on the second challenge corresponding to the second challenge type. In one use case, responsive to the second challenge corresponding to the second challenge type, a private key associated with the second challenge type may be selected (from multiple private keys) to generate the second challenge response. As described herein, in some embodiments, the second challenge response may be generated based on a private key, a public key (corresponding to the private key), or other information. Operation 426 may be performed by a main token component or secure component that are the same as or similar to main token component 122 or secure component 124, in accordance with one or more embodiments.

In an operation 428, the second challenge response may be provided (e.g., to the computer system from which the second challenge was obtained). As an example, if the second challenge response is generated by a token (e.g., a short-range wireless token or other token), the token may provide the second challenge response to the computer system via a connection established between the token and the computer system (e.g., via a wireless or wired connection). Operation 428 may be performed by a main token component that is the same as or similar to main token component 122, in accordance with one or more embodiments.

Figure 5:
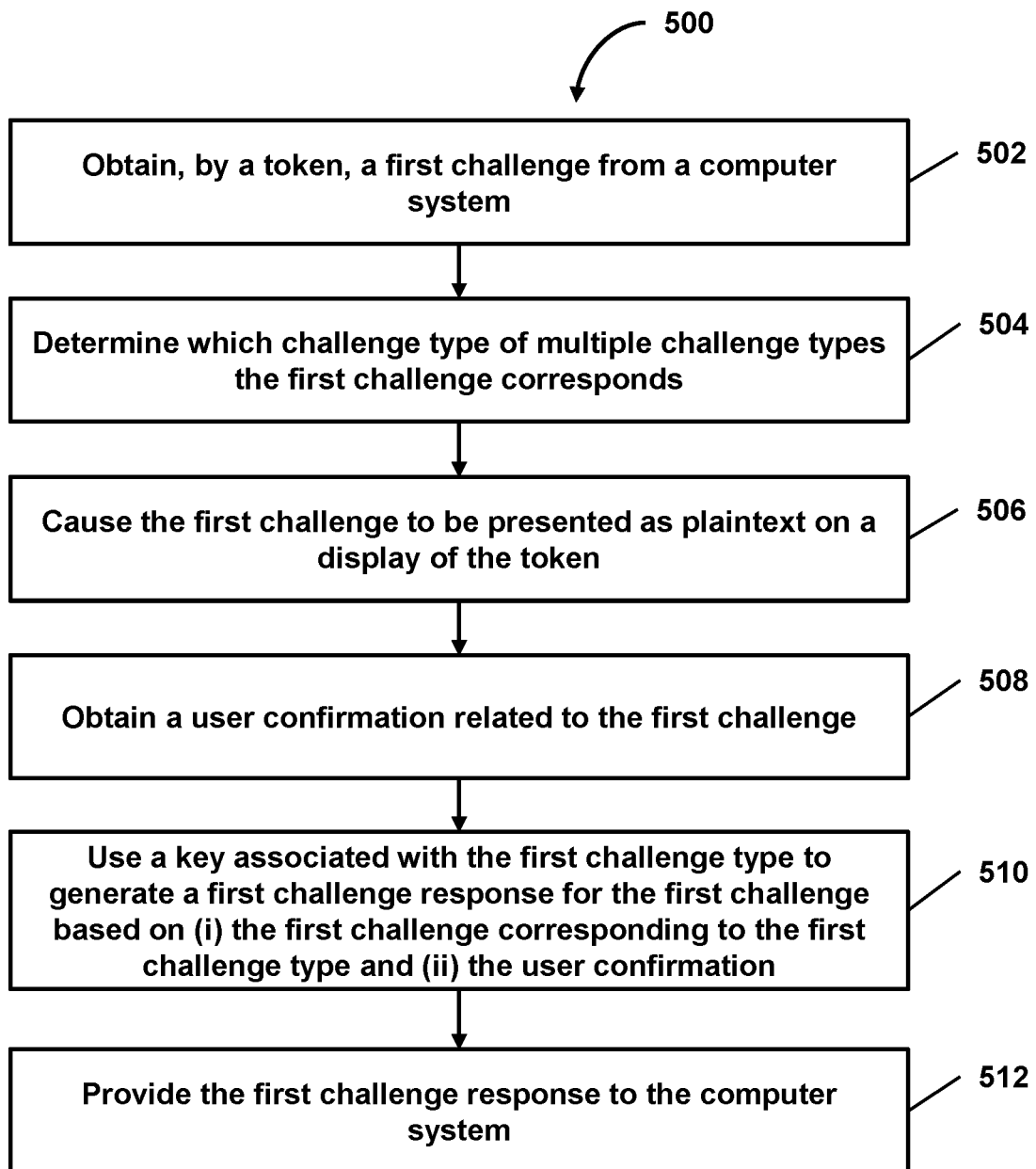
FIG. 5 shows a flowchart of a method of facilitating authentication via a token and user confirmation with respect to a challenge, in accordance with one or more embodiments.

FIG. 5 shows a flowchart of a method 500 of facilitating authentication via a token and user confirmation with respect to a challenge, in accordance with one or more embodiments. In an operation 502, a first challenge may be obtained by a token (e.g., a short-range wireless token or other token) from a computer system via a connection established between the token and the computer system (e.g., via a wireless or wired connection). As an example, the first challenge may be a randomly-generated challenge or other automatically-generated challenge, a manual user input, or other challenge. Operation 502 may be performed by a main token component that is the same as or similar to main token component 122, in accordance with one or more embodiments.

In an operation 504, a determination of which challenge type (of multiple challenge types) the first challenge corresponds may be effectuated. As an example, the determination regarding the first challenge's challenge type may be based on a size of the first challenge (e.g., number of characters, number of bits, etc.), content of the first challenge (e.g., what characters the first challenge includes, where such characteristics are positioned within the first challenge, etc.), or other criteria. Operation 504 may be performed by a main token component or secure component that are the same as or similar to main token component 122 or secure component 124, in accordance with one or more embodiments.

In an operation 506, the first challenge may be presented as plaintext on a display of the token. In some embodiments, the first challenge may be presented as plaintext on the token's display based on the first challenge corresponding to the first challenge type. As an example, the first challenge may be determined to match the first challenge type based on a size of the first challenge (e.g., number of characters, number of bits, etc.), content of the first challenge (e.g., what characters the first challenge includes, where such characteristics are positioned within the first challenge, etc.), or other criteria. Operation 506 may be performed by a main token component that is the same as or similar to main token component 122, in accordance with one or more embodiments.

In an operation 508, a user confirmation related to the first challenge may be obtained. As an example, the user confirmation may be a confirmation of validity of the first challenge (e.g., the first challenge accurately reflects a user input entered by a user, an identifier associated with the user, a randomly-generated code associated with the user, transaction data, etc.). As another example, the user confirmation may be provided via a physical action invoked with respect to the token, which indicates confirmation of the validity of what was presented on the token's display (e.g., a hard or soft button/key or other input component on or connected to the token being pressed, held for a predetermined period of time, released, etc.). Operation 508 may be performed by a main token component that is the same as or similar to main token component 122, in accordance with one or more embodiments.

In an operation 510, a key associated with the first challenge type may be used to generate a first challenge response (for the first challenge) based on (i) the first challenge corresponding to the first challenge type and (ii) the user confirmation. As an example, the key associated with first challenge type being selected from multiple keys based on the first challenge corresponding to the first challenge type. In one use case, responsive to the first challenge corresponding to the first challenge type, a private key associated with the first challenge type may be selected (from multiple private keys) to generate the first challenge response. As another example, the user confirmation may be a triggering event that causes a secure component of the token to generate the first challenge response. Operation 510 may be performed by a main token component or secure component that are the same as or similar to main token component 122 or secure component 124, in accordance with one or more embodiments.

In an operation 512, the first challenge response may be provided to the computer system. As an example, the first challenge response may be provided by the token to the computer system via a connection established between the token and the computer system (e.g., via a wireless or wired connection). Operation 512 may be performed by a main token component that is the same as or similar to main token component 122, in accordance with one or more embodiments.

Figure 6:
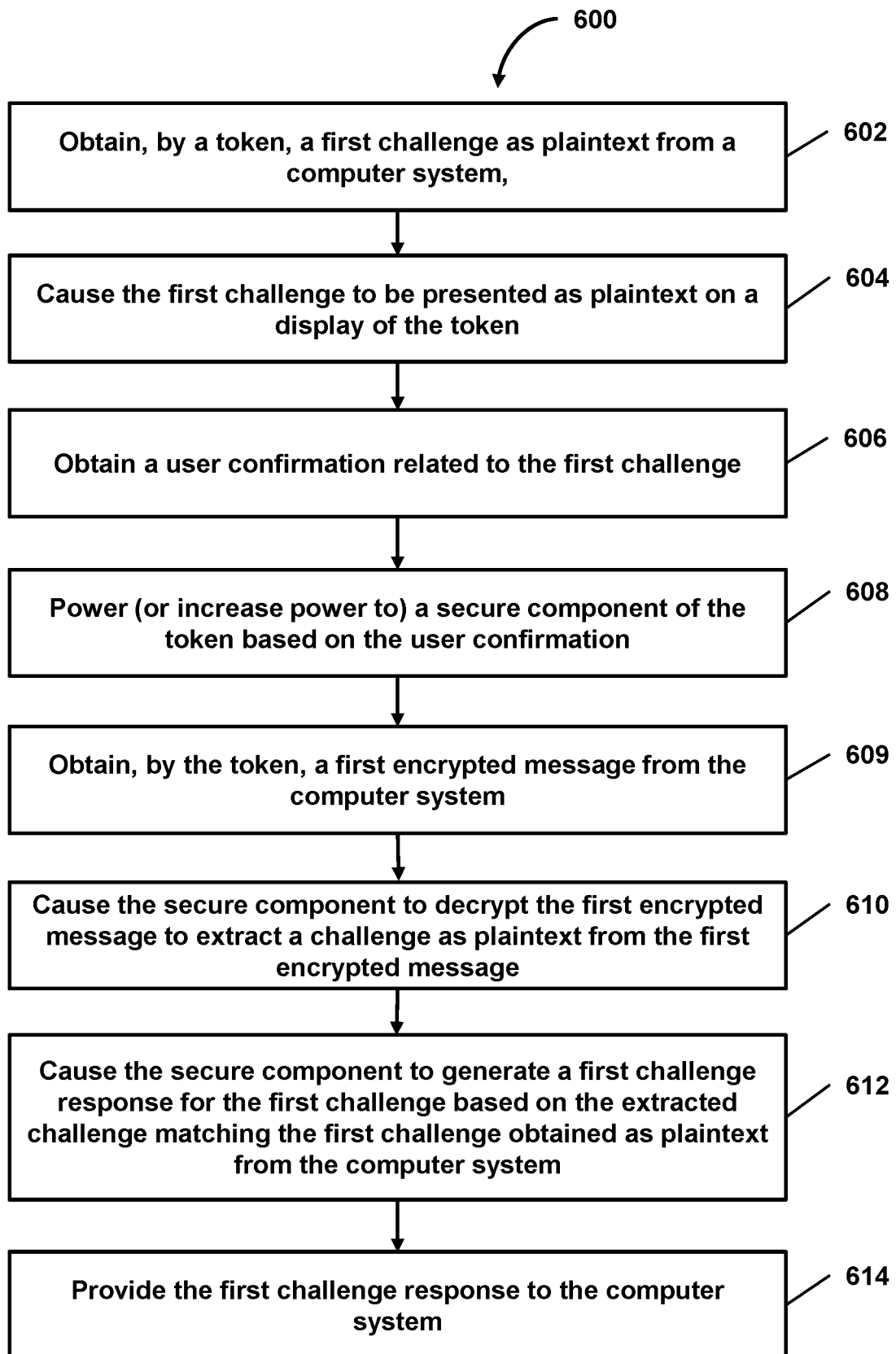
FIG. 6 shows a flowchart of a method of facilitating reduction of power consumption of a token, in accordance with one or more embodiments.

FIG. 6 shows a flowchart of a method of facilitating reduction of power consumption of a token, in accordance with one or more embodiments. In an operation 602, a first challenge (in plaintext) may be obtained by a token (e.g., a short-range wireless token or other token) from a computer system via a connection established between the token and the computer system (e.g., via a wireless or wired connection). As an example, the first challenge may be a randomly-generated challenge or other automatically-generated challenge, a manual user input, or other challenge. Operation 602 may be performed by a main token component that is the same as or similar to main token component 122, in accordance with one or more embodiments.

In an operation 604, the first challenge may be presented as plaintext on a display of the token. In some embodiments, the first challenge may be presented as plaintext on the token's display based on the first challenge corresponding to a first challenge type. As an example, the first challenge may be determined to match the first challenge type based on a size of the first challenge (e.g., number of characters, number of bits, etc.), content of the first challenge (e.g., what characters the first challenge includes, where such characteristics are positioned within the first challenge, etc.), or other criteria. Operation 604 may be performed by a main token component that is the same as or similar to main token component 122, in accordance with one or more embodiments.

In an operation 606, a user confirmation related to the first challenge may be obtained. As an example, the user confirmation may be a confirmation of validity of the first challenge (e.g., the first challenge accurately reflects a user input entered by a user, an identifier associated with the user, a randomly-generated code associated with the user, etc.). As another example, the user confirmation may be provided via a physical action invoked with respect to the token, which indicates confirmation of the validity of what was presented on the token's display (e.g., a hard or soft button/key or other input component on or connected to the token being pressed, held for a predetermined period of time, released, etc.). Operation 606 may be performed by a main token component that is the same as or similar to main token component 122, in accordance with one or more embodiments.

In an operation 608, a secure component of the token may be powered (or have its power increased) based on the user confirmation. As an example, the user confirmation may be a triggering event that causes the secure component of the token to be powered (or causes an increase of power to be provided to the secure component). In one use case, the secure component may be turned off prior to the obtainment of the user confirmation, and, responsive to the user confirmation, the secure component may be caused to be turned on by the powering of the secure component. In another use case, the secure component may be in a "suspended" mode (or other mode that requires substantially less power than normal operations), and the secure component may be switched to a "normal" mode (or other operating mode that requires substantially more power than "suspended" mode). Operation 608 may be performed by a main token component that is the same as or similar to main token component 122, in accordance with one or more embodiments.

In an operation 609, a first encrypted message may be obtained by the token from the computer system. As an example, the secure component (of the token) may establish a secure end-to-end connection between the token and the computer system. The token (or the secure component) may then obtain the first encrypted message via the secure end-to-end connection. Operation 609 may be performed by a main token component or secure component that are the same as or similar to main token component 122 or secure component 124, in accordance with one or more embodiments.

In an operation 610, the secure component (of the token) may be caused to decrypt the first encrypted message to extract a challenge as plaintext from the first encrypted message. Operation 610 may be performed by a main token component or secure component that are the same as or similar to main token component 122 or secure component 124, in accordance with one or more embodiments.

In an operation 612, the secure component may be caused to generate a first challenge response (for the first challenge) based on the extracted challenge matching the first challenge obtained as plaintext from the computer system. Operation 612 may be performed by a main token component or secure component that are the same as or similar to main token component 122 or secure component 124, in accordance with one or more embodiments.

In an operation 614, the first challenge response may be provided to the computer system. As an example, the first challenge response may be provided by the token to the computer system via a connection established between the token and the computer system (e.g., via a wireless or wired connection). Operation 614 may be performed by a main token component that is the same as or similar to main token component 122, in accordance with one or more embodiments.

Figure 7A:
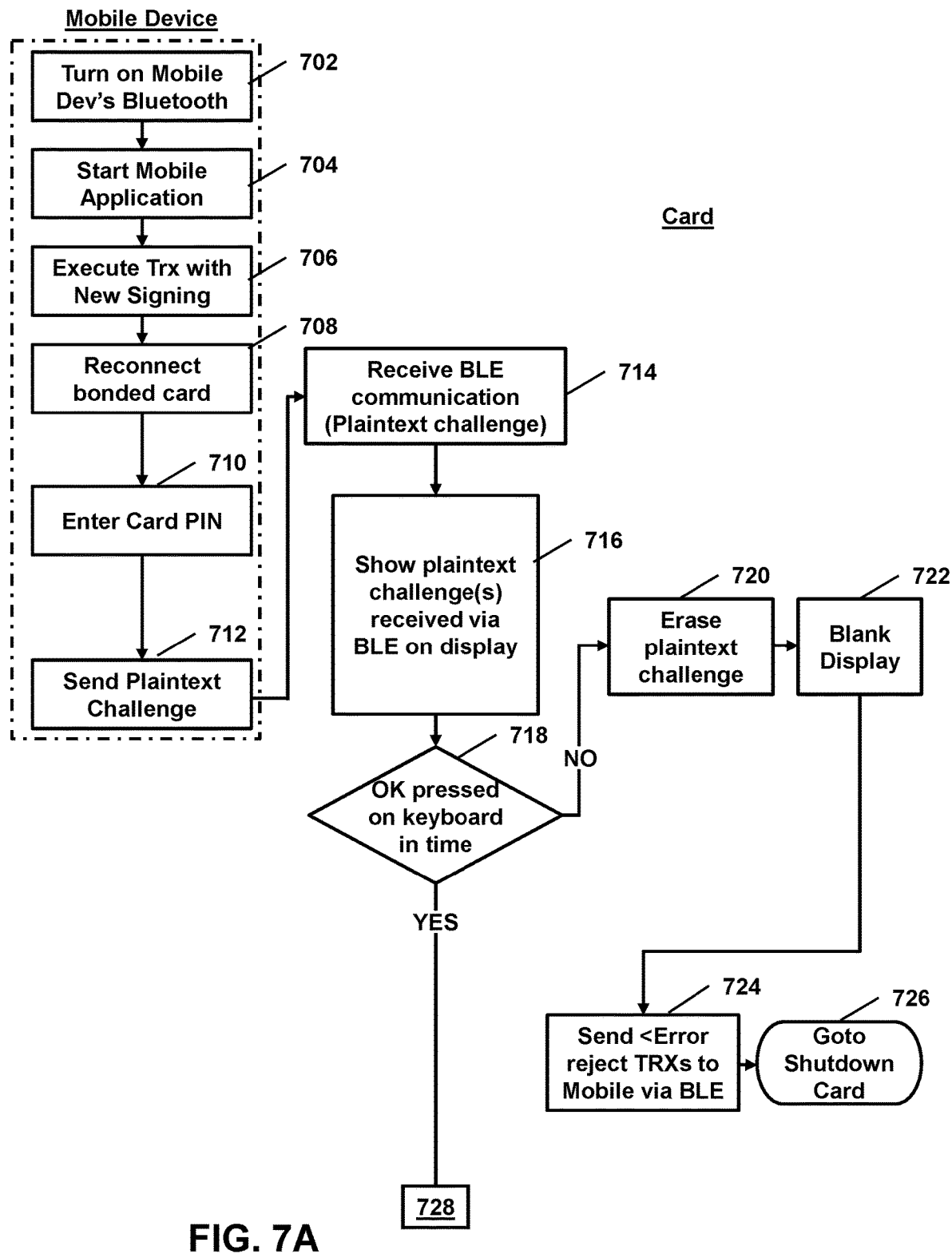
FIGS. 7A-7C show a flowchart of an example use case of authentication via a token, in accordance with one or more embodiments.
Figure 7B:
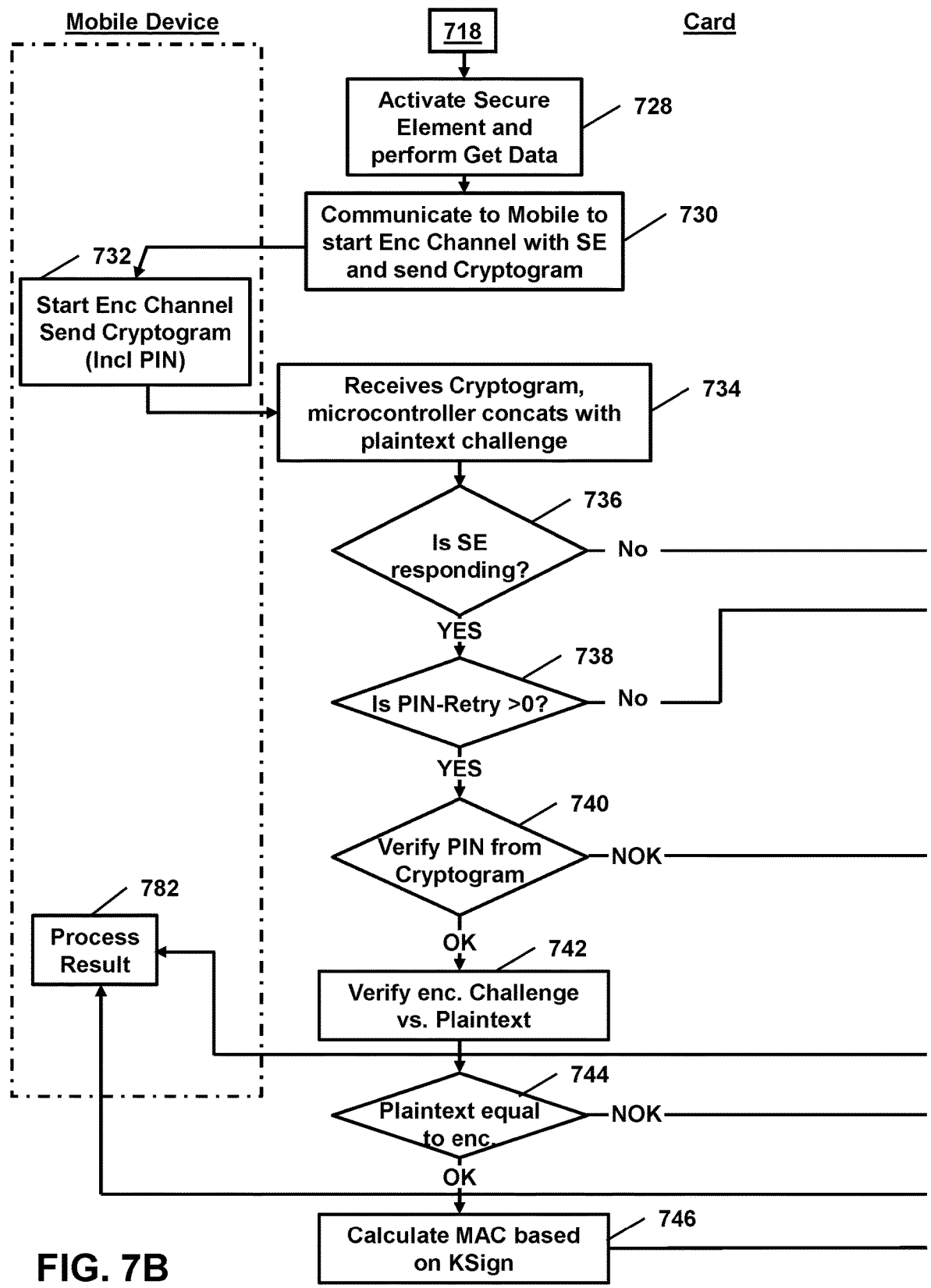
Figure 7C:
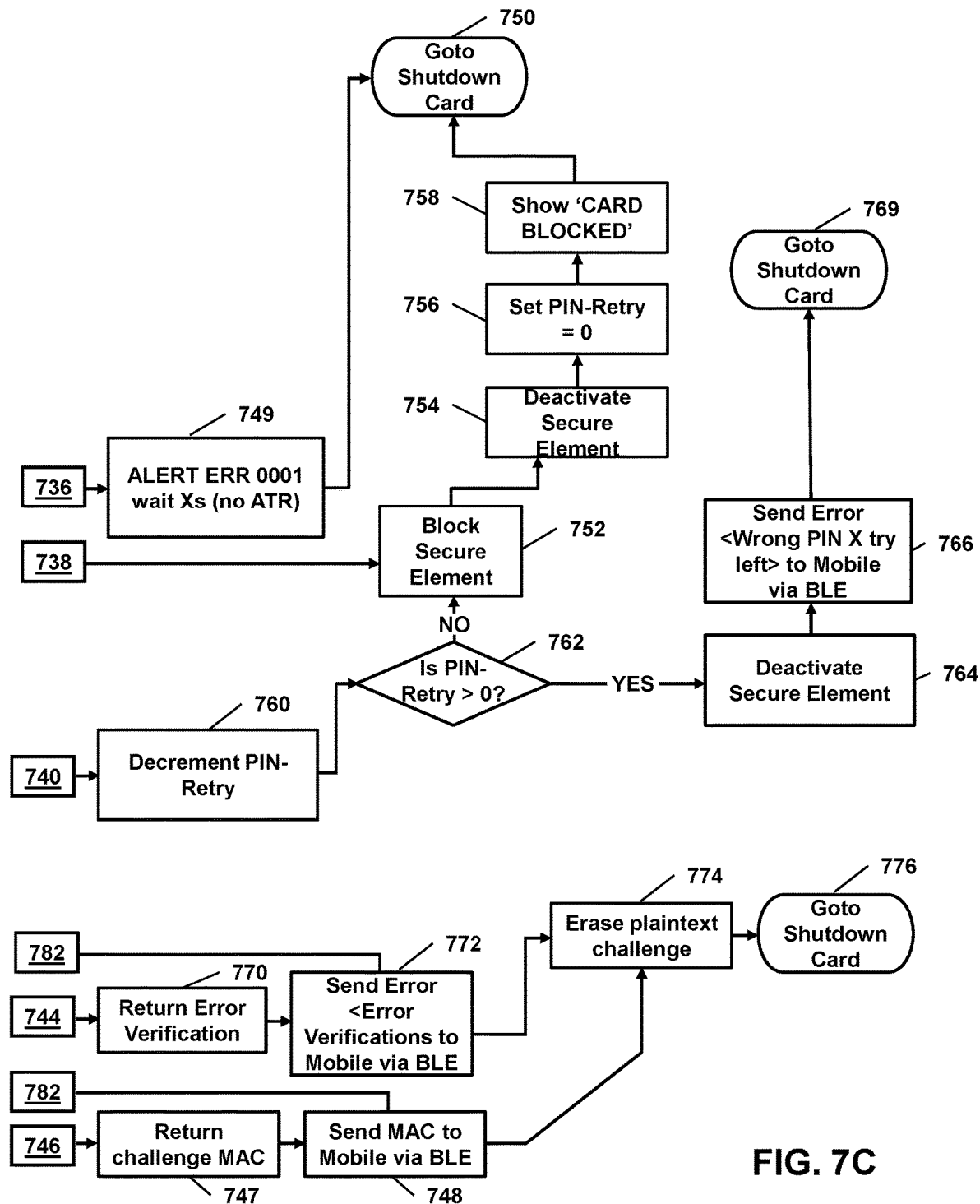

FIGS. 7A-7C show a flowchart of an example use case of authentication via a token, in accordance with one or more embodiments. In the use case, with regard to signing, a mobile device's Bluetooth capabilities are turned on, and the applicable mobile application on the mobile device is started (operations 702 and 704). For a transaction that requires that the user (e.g., a prospective customer or other user) to electronically sign the transaction, the mobile application causes the mobile device to re-bond with an authentication/signing card (e.g., an example of a short-range wireless token 106) (operations 706 and 708). When the card's PIN is entered by the user into the mobile application, the mobile application sends the plaintext challenge to the card (operations 710 and 712).

In addition, with respect to the use case, the card receives the plaintext challenge via a BLE communication (operation 714). The card shows the plaintext challenge on the card's display (operation 716). In some embodiments, the plaintext challenge is shown on the card's display based on a determination that the challenge corresponds to a particular challenge type (e.g., based on a size of the challenge being different from a size of a typical challenge, based on content of the challenge indicating the challenge type, etc.). Responsive to an "OK" button not being pressed on the card's keyboard within a particular threshold amount of time (or an input indicating that the displayed challenge is inaccurate is obtain), the card (i) erases the plaintext challenge from the display (and/or from the card), resulting in a blank display or other display indicating the erasure of the plaintext challenge, (ii) sends an error rejecting the transaction to the mobile device via a BLE communication, and (iii) shuts down the card (operations 718, 720, 722, 724, and 726).

On the other hand, responsive to the "OK" button being pressed on the card's keyboard within the threshold amount of time (or an input indicative of user confirmation of the accuracy of the plaintext challenge being obtained within the threshold amount of time), the card may activate its secure element and communicate to the mobile application (and mobile device) to start encrypted communication with the card's secure element (and to send an cryptogram to the card's secure element) (operations 728 and 730). The mobile application (on the mobile device) may start an encrypted channel between the mobile device and the card, and send a cryptogram (which includes the encrypted PIN and encrypted challenge) to the card (operation 732). The card may receive the cryptogram via its transceiver, and the card's microcontroller may concatenate the cryptogram with the plaintext challenge (operation 734). If the secure element chip is responding, the number of PIN retries remaining is greater than zero, and the PIN is verified and determined to be valid, then the card's secure element performs verification by comparing the encrypted challenge with the plaintext challenge (operations 726, 738, and 740). If the encrypted challenge equals the plaintext challenge (or vice versa), the card's secure element calculates a MAC based on a pre-stored signature key (e.g., a private key stored in a secure memory within the secure element or other signature key) (operations 742, 744, and 746). The secure element returns the MAC, and the card sends the MAC to the mobile application via a BLE communication, erases the plaintext challenge from the card, and shuts down the card (operations 747, 748, 774, and 776).

If the secure element is not responding at operation 736, then the card presents an error (e.g., after waiting a predetermined threshold amount of time) and shuts down the card (operations 749 and 750). If the number of PIN retries remaining is zero at operation 738, then the card blocks access to the secure element, deactivates the secure element, presents an error indicating that the card is blocked (e.g., "CARD BLOCKED"), and shuts down the card (operations 752, 754, 756, 758, and 750). If the PIN is determined not to be valid at operation 740, then the card decrements the number of PIN retries remaining by one (operation 760). If the number of PIN retries remaining is still greater than zero, then the card deactivates the secure element, sends an error indicating that an incorrect PIN was entered (e.g., "Wrong PIN, X tries left"), and shuts down the card (operations 762, 764, 766, 769. On the other hand, if the number of PIN retries remaining is no longer greater than zero at operation 762, then the card performs operations 752, 754, 756, 758, and 750.

If the encrypted challenge does not equal the plaintext challenge (or vice versa) at operation 744, then the CombOS chip (or its secure element) returns an error indicating that the verification failed, and the card sends the error to the mobile application via a BLE communication, erases the plaintext challenge from the card, and shuts down the card (operations 770, 772, 774, and 776).

In some embodiments, the various computers and components illustrated in FIG. 1 may include one or more computing devices that are programmed to perform the functions described herein. The computing devices may include one or more electronic storages (e.g., verification database(s) 132 or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The electronic storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of components 112-124 or other components. The processors may be programmed to execute computer program instructions by software; hardware; firmware; some combination of software, hardware, or firmware; and/or other mechanisms for configuring processing capabilities on the processors.

It should be appreciated that the description of the functionality provided by the different components 112-124 described herein is for illustrative purposes, and is not intended to be limiting, as any of components 112-124 may provide more or less functionality than is described. For example, one or more of components 112-124 may be eliminated, and some or all of its functionality may be provided by other ones of components 112-124. As another example, additional components may be programmed to perform some or all of the functionality attributed herein to one of components 112-124.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The present techniques will be better understood with reference to the following enumerated embodiments:

1. A method comprising: obtaining a first challenge from a client device; determining which challenge type of multiple challenge types the first challenge corresponds; causing the secure component to use a key associated with a first challenge type to generate a first challenge response for the first challenge based on the first challenge corresponding to the first challenge type; and providing the first challenge response to the client device.

2. The method of embodiment 1, comprising: obtaining a second challenge from the client device, the second challenge being obtained from the client device prior to or subsequent to the first challenge being obtained from the client device; determining which challenge type of the multiple challenge types the second challenge corresponds; causing the secure component to use a key associated with a second challenge type to generate a second challenge response for the second challenge based on the second challenge corresponding to the second challenge type, the second challenge type being different from the first challenge type; and providing the second challenge response to the client device.

3. The method of embodiment 2, wherein the key associated with the first challenge type and the key associated with the second challenge type are different from one another.

4. The method of embodiment 2, wherein the key associated with the first challenge type and the key associated with the second challenge type are the same as one another.

5. The method of any of embodiments 1-4, comprising: causing the first challenge to be presented as plaintext on a display of a token; obtaining, subsequent to the first challenge being presented on the display of the token, a user confirmation of validity of the first challenge; and causing the secure component to use the key associated with the first challenge type to generate the first challenge response for the first challenge based on (i) the first challenge corresponding to the first challenge type and (ii) the user confirmation of the validity of the first challenge.

6. The method of any of embodiments 1-5, comprising: obtaining, from the client device, the first challenge as plaintext and a first encrypted message, the first encrypted message comprising the first challenge; causing the first challenge to be presented as plaintext on a display of a token; obtaining, subsequent to the first challenge being presented on the display of the token, a user confirmation of validity of the first challenge; and causing the secure component to decrypt the first encrypted message to extract the first challenge as plaintext from the first encrypted message based on the user confirmation of the validity of the first challenge; and causing the secure component to use the key associated with the first challenge type to generate the first challenge response for the first challenge based on (i) the first challenge corresponding to the first challenge type and (ii) the extracted first challenge matching the first challenge obtained as plaintext from the client device.

7. The method of embodiment 6, comprising: powering or increasing power to the secure component based on the user confirmation of the validity of the first challenge.

8. The method of embodiment 7, wherein the first encrypted message is obtained from the client device subsequent to the powering or increasing of power to the secure component.

9. The method of any of embodiments 7-8, comprising: establishing, via the secure component, a secure end-to-end connection between the secure component and the client device subsequent to the powering or increasing of power to the secure component; and obtaining the first encrypted message from the client device via the secure end-to-end connection that is established subsequent to the powering or increasing of power to the secure component.

10. The method of any of embodiments 6-9, wherein the first encrypted message comprises the first challenge and an entity identifier, the method comprising: causing the secure component to use the key associated with the first challenge type to generate the first challenge response for the first challenge based on (i) the first challenge corresponding to the first challenge type, (ii) the user confirmation of the validity of the first challenge, and (iii) verification of the entity identifier indicating the entity identifier to be a valid entity identifier.

11. The method of any of embodiments 1-10, comprising: determining, based on a size of the first challenge, which challenge type of the multiple challenge types the first challenge corresponds, wherein the first challenge is determined to correspond to the first challenge type based on the size of the first challenge.

12. The method of any of embodiments 1-11, comprising: determining, based on content of the first challenge, which challenge type of the multiple challenge types the first challenge corresponds, wherein the first challenge is determined to correspond to the first challenge type based on the content of the first challenge.

13. The method of any of embodiments 1-12, wherein the first challenge response includes a first MAC or other integrity code.

14. A method comprising: obtaining, from a client device, a first challenge as plaintext and a first encrypted message, the first encrypted message comprising the first challenge; causing the first challenge to be presented as plaintext on a display of a token; obtaining, subsequent to the first challenge being presented on the display of the token, a user confirmation of validity of the first challenge; and causing a secure component of the token to decrypt the first encrypted message to extract the first challenge as plaintext from the first encrypted message based on the user confirmation of the validity of the first challenge; and causing the secure component to generate the first challenge response for the first challenge based on the extracted first challenge matching the first challenge obtained as plaintext from the client device.

15. The method of embodiment 14, wherein the first encrypted message comprises the first challenge and an entity identifier, the method comprising: causing the secure component to generate the first challenge response for the first challenge based on (i) based on the extracted first challenge matching the first challenge obtained as plaintext from the client device and (ii) verification of the entity identifier indicating the entity identifier to be a valid entity identifier.

16. The method of any of embodiments 14-16, comprising: powering or increasing power to the secure component based on the user confirmation of the validity of the first challenge.

17. The method of embodiment 16, wherein the first encrypted message is obtained from the client device subsequent to the powering or increasing of power to the secure component.

18. The method of any of embodiments 16-17, comprising: establishing, via the secure component, a secure end-to-end connection between the secure component and the client device subsequent to the powering or increasing of power to the secure component; and obtaining the first encrypted message from the client device via the secure end-to-end connection that is established subsequent to the powering or increasing of power to the secure component.

19. The method of any of embodiments 14-18, wherein the first challenge response includes a first MAC or other integrity code.

20. A method comprising operations comprising those of any of embodiments 1-18, wherein the operations are performed by a short-range wireless token or other token.

21. A tangible, non-transitory, machine-readable medium storing instructions that, when executed by a data processing apparatus, cause the data processing apparatus to perform operations comprising those of any of embodiments 1-20.

22. A token comprising: a secure component including memory configured to store one or more keys; and one or more processors and memory storing instructions that, when executed by the processors, cause the processors to effectuate operations comprising those of any of embodiments 1-20.

What is claimed is:

1. A short-range wireless token for facilitating authentication, the token comprising:
    a secure component comprising memory configured to store keys associated with multiple challenge types, the multiple challenge types comprising (i) a first challenge type that satisfies one or more first format criteria and (ii) a second challenge type that satisfies one or more second format criteria different from the one or more first format criteria; and
    one or more processors programmed with computer program instructions that, when executed, cause the token to:
        obtain a challenge from a client device;
        determine a challenge type to which the challenge corresponds such that (i) the challenge is determined to correspond to the first challenge type in response to the challenge satisfying the one or more first format criteria and (ii) the challenge is determined to correspond to the second challenge type in response to the challenge satisfying the one or more second format criteria;
        cause the secure component to generate a challenge response for the challenge by (i) using a first key associated with the first challenge type in response to the challenge being determined to correspond to the first challenge type and (ii) using a second key associated with the second challenge type in response to the challenge being determined to correspond to the second challenge type; and
        provide the challenge response to the client device;
    wherein the one or more first format criteria comprises a first size or position criterion, and the one or more second format criteria comprises a second size or position criterion different from the first size or position criterion such that (i) the challenge is determined to correspond to the first challenge type in response to the challenge having a length satisfying the first size or position criterion and (ii) the challenge is determined to correspond to the second challenge type in response to the challenge having a length satisfying the second size or position criterion.

2. The token of claim 1, the first size or position criterion comprises a first position criterion, and the second size or position criterion comprises a second position criterion different from the first position criterion such that (i) the challenge is determined to correspond to the first challenge type in response to the challenge having content satisfying the first position criterion and (ii) the challenge is determined to correspond to the second challenge type in response to the challenge having content satisfying the second position criterion.

3. The token of claim 1, wherein the token further comprises a display, and wherein the token is caused to:
    cause the challenge to be presented as plaintext on the display of the token;

obtain, subsequent to the challenge being presented on the display of the token, a user confirmation of validity of the challenge; and cause the secure component to use the first key associated with the first challenge type to generate the challenge response for the challenge based on (i) the challenge corresponding to the first challenge type and (ii) the user confirmation of the validity of the challenge.

4. The token of claim 1, wherein the token further comprises a display, and wherein the token is caused to:

obtain, from the client device, the challenge as plaintext and an encrypted message, the encrypted message comprising the challenge;

cause the challenge to be presented as plaintext on the display of the token;

obtain, subsequent to the challenge being presented on the display of the token, a user confirmation of validity of the challenge;

power or increase power to the secure component based on the user confirmation of the validity of the challenge;

cause the secure component to decrypt the encrypted message to extract the challenge as plaintext from the encrypted message based on the user confirmation of the validity of the challenge; and cause the secure component to use the first key associated with the first challenge type to generate the challenge response for the challenge based on (i) the challenge corresponding to the first challenge type and (ii) the extracted challenge matching the challenge obtained as plaintext from the client device.

5. The token of claim 4, wherein the encrypted message is obtained from the client device subsequent to the powering or increasing of power to the secure component.

6. The token of claim 4, wherein the token is caused to:

establish, via the secure component, a secure end-to-end connection between the secure component and the client device subsequent to the powering or increasing of power to the secure component; and obtain the first encrypted message from the client device via the secure end-to-end connection that is established subsequent to the powering or increasing of power to the secure component.

7. The token of claim 4, wherein the encrypted message comprises the challenge and an entity identifier, and wherein the token is caused to:

cause the secure component to use the first key associated with the first challenge type to generate the challenge response for the challenge based on (i) the challenge corresponding to the first challenge type, (ii) the user confirmation of the validity of the challenge, and (iii) verification of the entity identifier indicating the entity identifier to be a valid entity identifier.

8. The token of claim 1, wherein the first key associated with the first challenge type and the second key associated with the second challenge type are different from one another.

9. A method comprising:

obtaining, by a token, a challenge from a client device;

determining, by the token, a challenge type to which the challenge corresponds such that (i) the challenge is determined to correspond to a first challenge type in response to the challenge satisfying one or more first layout criteria and (ii) the challenge is determined to correspond to a second challenge type in response to the challenge satisfying one or more second layout criteria;

causing, by the token, a secure component of the token to generate a challenge response for the challenge by (i) using a first key associated with the first challenge type in response to the challenge being determined to correspond to the first challenge type and (ii) using a second key associated with the second challenge type in response to the challenge being determined to correspond to the second challenge type; and providing, by the token, the challenge response to the client device;

wherein the one or more first layout criteria comprises a first size or position criterion, and the one or more second layout criteria comprises a second size or position criterion different from the first size or position criterion such that (i) the challenge is determined to correspond to the first challenge type in response to the challenge having a length satisfying the first size or position criterion and (ii) the challenge is determined to correspond to the second challenge type in response to the challenge having a length satisfying the second size or position criterion.

10. The method of claim 9, wherein the first size or position criterion comprises a first position criterion, and the second size or position criterion comprises a second position criterion different from the first position criterion such that (i) the challenge is determined to correspond to the first challenge type in response to the challenge having content satisfying the first position criterion and (ii) the challenge is determined to correspond to the second challenge type in response to the challenge having content satisfying the second position criterion.

11. The method of claim 9, further comprising:

causing, by the token, the challenge to be presented as plaintext on a display of the token;

obtaining, by the token, subsequent to the challenge being presented on the display of the token, a user confirmation of validity of the challenge; and causing, by the token, the secure component to use the first key associated with the first challenge type to generate the challenge response for the challenge based on (i) the challenge corresponding to the first challenge type and (ii) the user confirmation of the validity of the challenge.

12. The method of claim 9, further comprising:

obtaining, by the token, from the client device, the challenge as plaintext and an encrypted message, the encrypted message comprising the challenge;

causing, by the token, the challenge to be presented as plaintext on a display of the token;

obtaining, by the token, subsequent to the challenge being presented on the display of the token, a user confirmation of validity of the challenge;

causing powering or increasing of power to the secure component based on the user confirmation of the validity of the challenge;

causing, by the token, the secure component to decrypt the encrypted message to extract the challenge as plaintext from the encrypted message based on the user confirmation of the validity of the challenge; and causing, by the token, the secure component to use the first key associated with the first challenge type to generate the challenge response for the challenge based on (i) the challenge corresponding to the first challenge type and (ii) the extracted challenge matching the challenge obtained as plaintext from the client device.

13. The method of claim 12, wherein the encrypted message comprises the first challenge and an entity identifier, the method further comprising:

causing, by the token, the secure component to use the first key associated with the first challenge type to generate the first challenge response for the first challenge based on (i) the first challenge corresponding to the first challenge type, (ii) the user confirmation of the validity of the first challenge, and (iii) verification of the entity identifier indicating the entity identifier to be a valid entity identifier.

* * * * *